US007967099B2

(12) United States Patent
Fausch

(10) Patent No.: US 7,967,099 B2
(45) Date of Patent: Jun. 28, 2011

(54) METHOD AND ARRANGEMENT OF A PLURALITY OF PROPEL PUMPS IN A HYDROSTATICALLY DRIVEN COMPACTOR

(75) Inventor: Craig Fausch, Ramsey, MN (US)

(73) Assignee: Caterpillar Paving Products Inc., Minneapolis, MN (US)

( * ) Notice: Subject to any disclaimer, the term of this patent is extended or adjusted under 35 U.S.C. 154(b) by 563 days.

(21) Appl. No.: 12/142,575

(22) Filed: Jun. 19, 2008

(65) Prior Publication Data

US 2009/0314571 A1  Dec. 24, 2009

(51) Int. Cl.
*B60K 17/00* (2006.01)
(52) U.S. Cl. ......... 180/308; 180/305; 180/306; 180/307
(58) Field of Classification Search .................. 180/305, 180/306, 307, 308
See application file for complete search history.

(56) References Cited

U.S. PATENT DOCUMENTS

| 3,448,577 | A | * | 6/1969 | Crawford | 60/420 |
|---|---|---|---|---|---|
| 3,907,053 | A | * | 9/1975 | Savage | 180/6.48 |
| 4,040,255 | A | * | 8/1977 | Hara | 60/445 |
| 4,149,253 | A |  | 4/1979 | Paar et al. |  |
| 4,236,595 | A | * | 12/1980 | Beck et al. | 180/243 |
| 5,390,759 | A | * | 2/1995 | Gollner | 180/307 |
| 5,692,377 | A |  | 12/1997 | Moriya et al. |  |
| 5,757,158 | A |  | 5/1998 | Ferguson et al. |  |
| 5,781,874 | A |  | 7/1998 | Troppman et al. |  |
| 5,784,883 | A | * | 7/1998 | Ohkura et al. | 60/327 |
| 5,915,492 | A | * | 6/1999 | Yates et al. | 180/197 |
| 5,946,910 | A |  | 9/1999 | Hayashi et al. |  |
| 5,993,110 | A |  | 11/1999 | Bueno |  |
| 6,135,231 | A | * | 10/2000 | Reed | 180/308 |
| 6,145,287 | A | * | 11/2000 | Rosskopf | 56/10.9 |
| 6,164,402 | A | * | 12/2000 | Hastreiter | 180/243 |
| 6,209,675 | B1 | * | 4/2001 | Hayashi et al. | 180/307 |
| 6,226,987 | B1 | * | 5/2001 | Hayashi et al. | 60/447 |
| 6,241,420 | B1 | * | 6/2001 | Perrin et al. | 404/84.1 |
| 6,267,163 | B1 | * | 7/2001 | Holmes | 144/336 |
| 6,321,153 | B1 |  | 11/2001 | Rocke et al. |  |
| 6,321,866 | B1 | * | 11/2001 | Prohaska | 180/307 |
| 6,336,518 | B1 | * | 1/2002 | Matsuyama | 180/306 |
| 6,360,537 | B1 | * | 3/2002 | Wiedemann | 60/451 |
| 6,408,972 | B1 | * | 6/2002 | Rodgers et al. | 180/197 |
| 6,578,358 | B1 | * | 6/2003 | Schuh | 60/448 |
| 6,631,320 | B1 |  | 10/2003 | Holt et al. |  |
| 6,644,429 | B2 | * | 11/2003 | Evans et al. | 180/307 |
| 6,662,895 | B1 | * | 12/2003 | Bednar | 180/308 |

(Continued)

FOREIGN PATENT DOCUMENTS

EP          1232067         6/2005

*Primary Examiner* — Hau V Phan
*Assistant Examiner* — Jacob Meyer
(74) *Attorney, Agent, or Firm* — Leydig, Voit & Mayer

(57) ABSTRACT

Fluid control propulsion system, machine including the system, and method of controlling the propulsion of a machine having a compacting drum and a wheel mounted on an axle, drum and axle motors operatively connected with the drum and the axle, respectively, and drum and axle pumps operatively connected to an engine and fluidly connected to the pumps. A fluid control orifice disposed in fluid communication between the pumps is selectively disengageable in response to at least one of operator instruction, sensed pressure differential between the drum and axle pumps, and sensed disparity in rotational speed between the drum and axle.

20 Claims, 3 Drawing Sheets

U.S. PATENT DOCUMENTS

| | | | |
|---|---|---|---|
| 6,732,828 B1 * | 5/2004 | Abend et al. | 180/242 |
| 6,742,619 B2 * | 6/2004 | Farbotnik et al. | 180/312 |
| 6,742,960 B2 | 6/2004 | Corcoran et al. | |
| RE38,632 E * | 10/2004 | Schmidt et al. | 701/41 |
| 6,827,524 B2 * | 12/2004 | Starry et al. | 404/129 |
| 6,938,719 B2 * | 9/2005 | Ishimaru et al. | 180/305 |
| 6,966,180 B2 * | 11/2005 | Deneir et al. | 60/327 |
| 6,973,821 B2 | 12/2005 | Corcoran | |
| 7,044,259 B2 * | 5/2006 | Stoll et al. | 180/307 |
| 7,069,722 B2 * | 7/2006 | Lonn | 60/430 |
| 7,383,913 B1 * | 6/2008 | Tsukamoto et al. | 180/307 |
| 7,614,843 B2 * | 11/2009 | Hested et al. | 414/739 |
| 7,770,685 B2 * | 8/2010 | Irwin et al. | 180/308 |
| 7,798,272 B2 * | 9/2010 | Pruitt et al. | 180/197 |
| 2004/0099464 A1 * | 5/2004 | Bednar | 180/306 |
| 2004/0141849 A1 * | 7/2004 | Deneir et al. | 417/32 |
| 2004/0195027 A1 * | 10/2004 | Abend et al. | 180/242 |
| 2006/0064974 A1 * | 3/2006 | Whitaker et al. | 60/468 |
| 2006/0243515 A1 * | 11/2006 | Okada et al. | 180/305 |
| 2007/0079533 A1 | 4/2007 | Kuerten | |
| 2009/0260911 A1 * | 10/2009 | Nozaki et al. | 180/307 |
| 2010/0050620 A1 * | 3/2010 | Basana et al. | 60/327 |

* cited by examiner

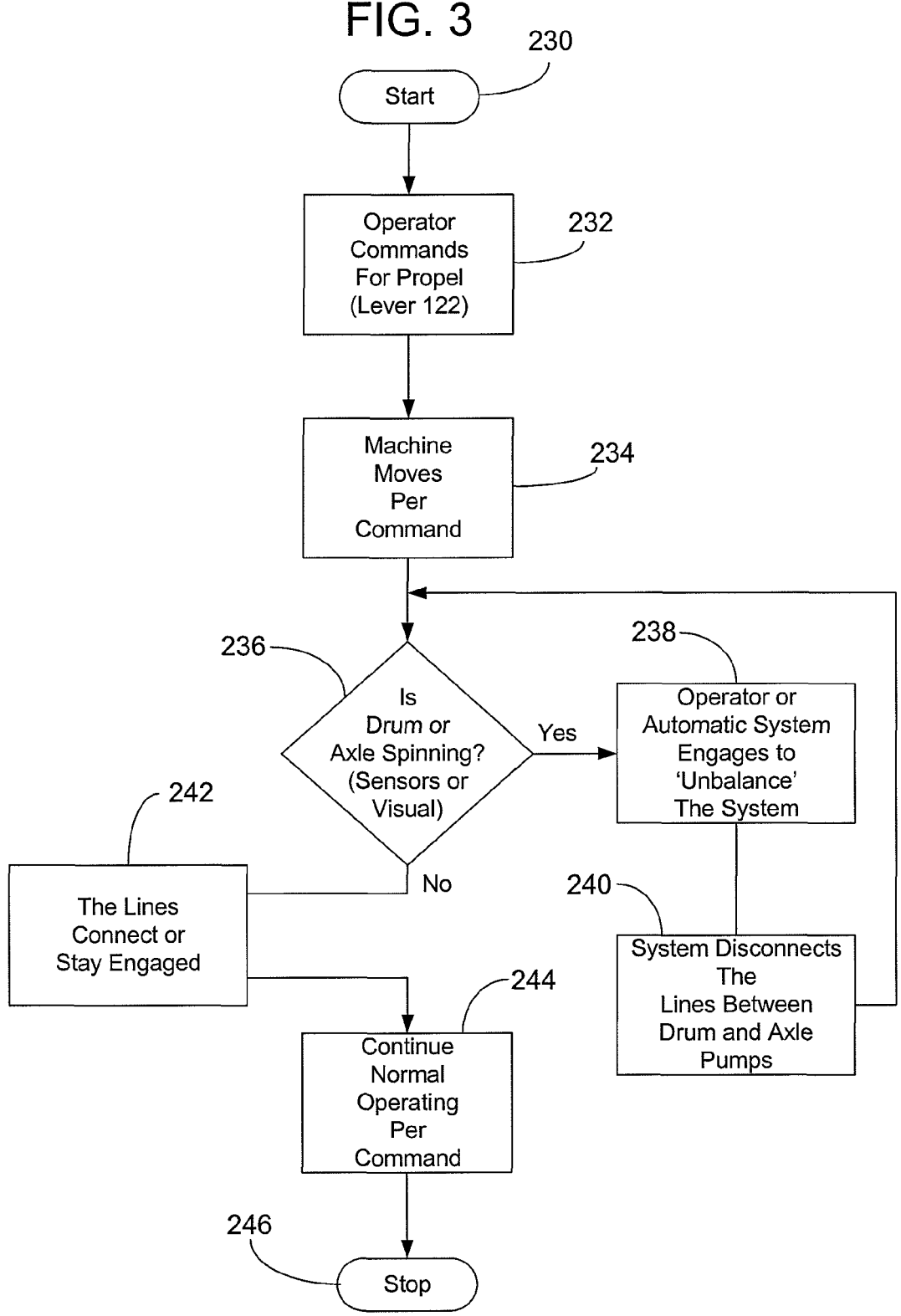

_US 7,967,099 B2_

METHOD AND ARRANGEMENT OF A PLURALITY OF PROPEL PUMPS IN A HYDROSTATICALLY DRIVEN COMPACTOR

TECHNICAL FIELD

This patent disclosure relates generally to hydrostatically driven compactors and, more particularly, to a method and arrangement to control the balance of a plurality of propel pumps in such machines.

BACKGROUND

Hydrostatically driven machines typically include at least one hydraulic pump driven by an engine or motor. The hydraulic pump propels a flow of fluid to one or more actuators, typically hydraulic motors, connected to motivators, such as drums and/or wheels of the machine. The flow of fluid from the pump passes through each actuator, causing the drum and/or wheels to rotate at a given rate to move the machine along at a desired travel speed. An operator adjusting a control input, for example, a lever, pedal, or any other appropriate device controls the motion of the machine.

Hydrostatically driven compactors typically include at least one drum along a first axis and a second motivator, such as one or more wheels, disposed along a second axis. In compactors where a single hydraulic pump is provided, a complex system of sensors and electronics is generally utilized to control the relative rotary motions of the respective drum and wheels.

Alternate arrangements include two pumps that are coupled to the respective drum and wheels. While pump displacement is generally controlled by the operator, an orifice may be provided between the working sides of the pumps to balance the load during normal usage. The balance between these pumps can be adversely affected by changes in pressure resulting from, for example, machine operation on uneven terrain. When the compactor is moving uphill with the drum in the uphill position, the weight of the machine typically shifts somewhat off of the drum, forcing fluid across the orifice to the uphill pump, ultimately affecting the torque balance and speed between the respective motors. More particularly, the reduction in pressure on the uphill drum results in an increase in speed, causing the drum to spin. A similar result may occur when the drum is positioned downhill relative to the wheels. Other ground conditions that offer disparate traction or the like may likewise result in the spinning of either the drum or the wheels. For example, loose sand or the like may cause slippage that could result in such spinning. This spinning of one set of motivators, be it the drum or the wheels, causes an undesirable "uncompaction" of the soil below. In addition, the overdriving of one of the pumps may result in reduced part life in extreme conditions.

Similar conditions may result in other hydrostatically motivated machines that are propelled by a plurality of pumps coupled to respective axles, and coupled together by an orifice between working sides of the pumps to balance load during normal usage.

Accordingly, it is desirable to provide an arrangement that overcomes or minimizes one or more of these conditions or effects.

SUMMARY

The disclosure provides a method of controlling the propulsion of a machine having at least first and second spaced motivators rotatably coupled to a main frame. The main frame supports an engine. A first motor and a second motor are operatively connected with the first and the second motivators, respectively. The method includes the steps of fluidly coupling a first pump to the first motor, operatively connecting the first pump to the engine, fluidly coupling a second pump to the second motor, operatively connecting the second pump to the engine, and disposing a fluid control orifice in fluid communication between the first and second pumps, the fluid control orifice being adapted to allow fluid flow between the first and second pumps. The method further includes the steps of selectively disengaging the orifice to discontinue flow between the first and second pumps in response to a signal during operation of the machine.

The disclosure further provide a fluid control system in a machine having at least first and second spaced motivators rotatably coupled to a main frame, the main frame supporting an engine. The fluid control system comprises first and second pumps connected to the engine, first and second motors operatively connected with the first and the second motivators, respectively, the first and second pumps being fluidly coupled to the first and second motors, respectively. A fluid control orifice is disposed to provide selective fluid communication between the first and second pumps, the fluid control orifice being selectively disengageable in response to a signal.

The disclosure also provides a machine comprising at least first and second spaced motivators rotatably coupled to a main frame, the main frame supporting an engine. First and second pumps are connected to the engine, first and second motors operatively connected with the first and the second motivators, respectively, the first and second pumps being fluidly coupled to the first and second motors, respectively. A fluid control orifice is disposed to provide selective fluid communication between the first and second pumps, the fluid control orifice being selectively disengageable in response to a signal.

BRIEF DESCRIPTION OF THE DRAWINGS

FIG. 3 is a high level block diagram of a method for operation of the hydraulic system.

DETAILED DESCRIPTION

This disclosure relates to hydrostatically operated machines. The examples presented for illustration relate to a hydrostatically driven machine and, more specifically, to a combination of components of the machine that yield a reduced engine operating speed for optimization of most operating conditions. The present disclosure is applicable to any type of machine having an associated hydraulic system including a plurality of pumps operatively connected to rotate respective motivators of the machine, such as wheels and/or drums, wherein the pumps are coupled by a fluid connection providing open flow between the pumps. A selectively disengageable fluid control orifice is provided between the drum and axle pumps such that flow between the pumps will be disengaged in response to at least one of an operator instruction or a sensed condition such as a pressure differential between the drum and axle pumps being in excess of a first preset level, or a disparity in rotational speed between the drum and the axle being in excess of a second preset level.

Figure 1:
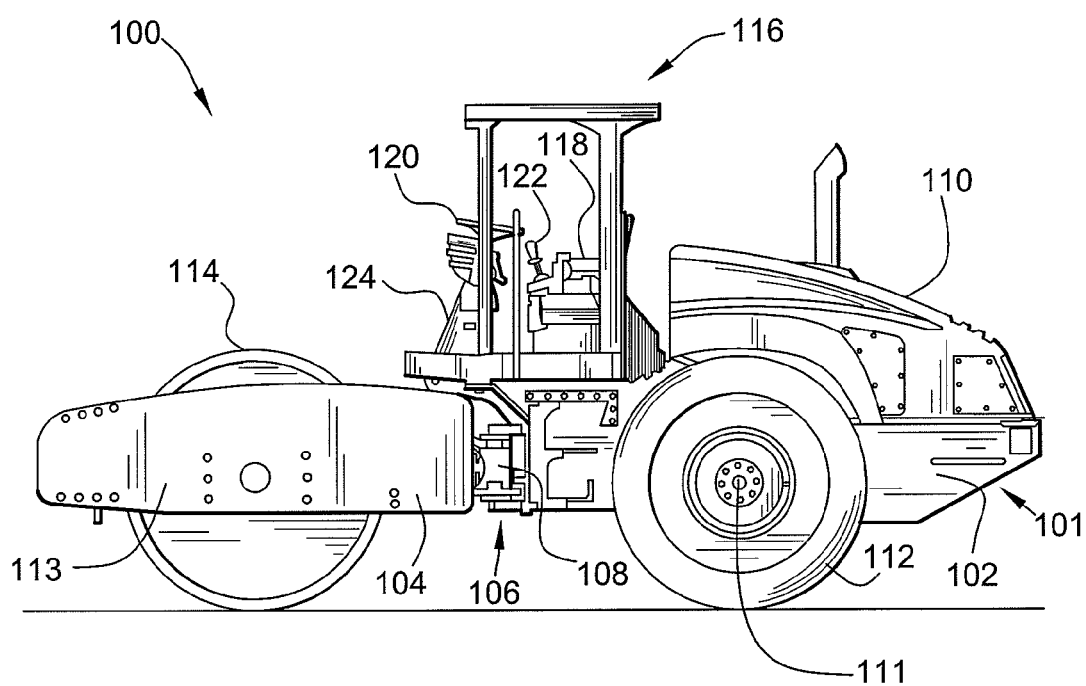
FIG. 1 is an outline view of a soil compactor as one example for a hydrostatically driven machine in accordance with the disclosure.

FIG. 1 shows an outline view of a machine 100 as one example of a hydrostatically driven machine. Although a soil compactor is illustrated in FIG. 1, the term "machine" may refer to any hydrostatic machine that performs some type of operation associated with an industry such as mining, paving, construction, farming, transportation, or any other industry known in the art, so long as the machine controls are arranged as claimed herein. For example, the machine 100 may be an asphalt, landfill, or pneumatic compactor, or an earth-moving machine, such as a wheel loader, excavator, dump truck, backhoe, motor-grader, material handler or the like.

The machine 100 includes a main frame 101 having an engine frame portion 102 and a yoke or non-engine frame portion 104. An articulated joint 106 that includes a hinge 108 connects the two portions of the frame 102 and 104, and facilitates steering of the machine 100 during operation. While an articulated main frame 101 is illustrated, the machine may alternately include a non-articulated main frame. The engine frame portion 102 of the main frame 101 generally supports an engine 110. The engine 110 may be of any appropriate design, such as, by way of example only, an internal combustion engine, or a compression ignition engine. In general, the engine 110 can be any prime mover that provides power to various systems of the machine typically by consuming fuel.

The main frame 101 is supported on at least a first motivator and a second motivator. In the exemplary machine 100 illustrated, the first motivator includes a rotatably mounted drum 114, and the second motivators include a pair of wheels 112. More specifically, the engine frame portion 102 also supports an axle 111 upon which a set of wheels 112 (only one wheel visible). Conversely, the non-engine frame portion 104 includes a yoke 113 that accommodates a drum 114 that rotates about a centerline thereof while the machine 100 is in motion. While the exemplary machine 100 illustrated includes a set of wheels 112 and a drum 114, the machine 100 could include alternate motivators, such as, by way of example only, two drums, or three or more wheels.

A cab 116 is typically mounted on the main frame 101 and may include a seat 118, a steering mechanism 120, a speed-throttle or control lever 122, and a console 124. An operator occupying the cab 116 can control the various functions and motion of the machine 100, for example, by using the steering mechanism 120 to set a direction of travel for the machine 100 or using the control lever 122 to set the travel speed of the machine. As can be appreciated, the representations of the various control mechanisms presented herein are generic and are meant to encompass all possible mechanisms or devices used to convey an operator's commands to a machine.

Figure 2:
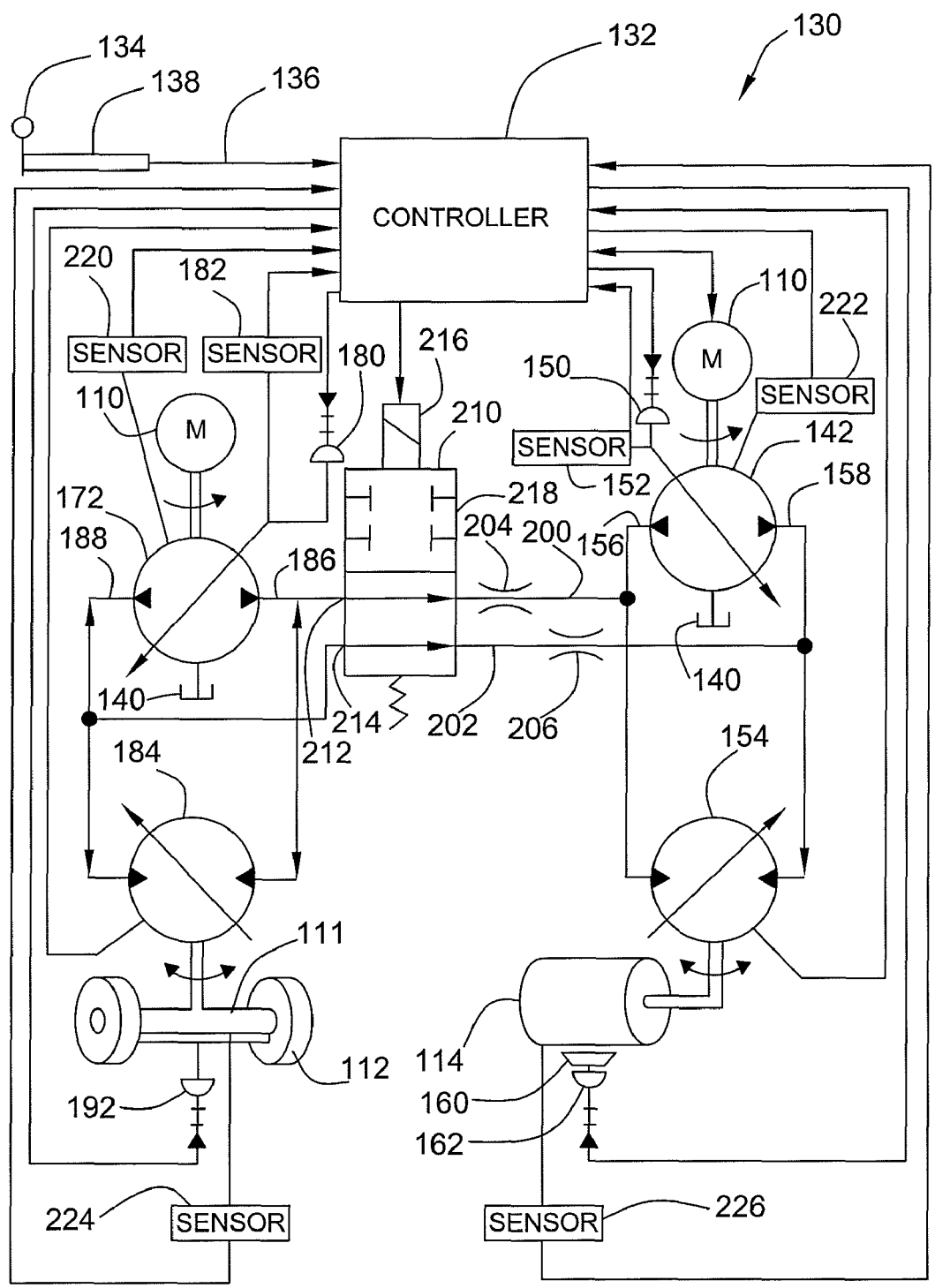
FIG. 2 is a schematic diagram of a hydraulic system in accordance with the disclosure.

A simplified circuit diagram of the hydraulic system 130 including electrical controls is shown in FIG. 2. The system 130, shown simplified for purposes of illustration, includes a portion of the drive circuit for driving the drum 114 and axle 111 of the machine 100. As can be appreciated, hydraulic components and connections to drive optional additional components, such as vibrators (not shown) within the drum 114, are not shown for the sake of simplicity. Additional hydraulic components and connections may be provided in alternate hydrostatically driven machines to perform operations such as, by way of example only, lifting and/or tilting of attached implements.

An electronic controller 132 is connected to the machine 100 and arranged to receive information from various sensors on the machine 100, process that information, and issue commands to various actuators within the system during operation. Connections pertinent to the present description are shown but, as can be appreciated, a great number of other connections may be present relative to the controller 132. In this embodiment, the controller 132 is connected to a control input 134 (such as control lever 122) via a control signal line 136. The control input 134, shown schematically, may be, for example, a lever moveable by the operator of the machine used to set a desired speed setting for the machine. In FIG. 2, the control input 134 may generate any appropriate instruction to be provided to the controller 132. The position of the control input 134 may be translated to a control signal through a sensor 138 associated with the control input 134. The control signal relayed to the controller 132 may be used in a calculation, along with other parameters, for example, the speed of the engine 110, the temperature of fluid within the reservoir 140, and so forth, to yield a desired operation of the machine 100.

Turning to the general operation of the hydraulic circuit 130 relative to the drum 114, a first pump, in this case, a variable displacement, bidirectional drum pump 142 is connected to a prime mover, in this case, the engine 110 of the machine 100. Hydraulic fluid is discharged from and supplied to the drum pump 142 from a vented reservoir or drain 140.

The drum pump 142 may be operated in any appropriate manner. In the disclosed arrangement, the control input 134 is connected to a servo control valve (not shown), which is arranged to change the angle of a swashplate (not shown) internal to the drum pump 142 in response to movement of the control input 134. Motion of the swashplate is accomplished by an actuator 150 connected to the control input 134. The displacement or angle of the control input 134, which is equivalent or proportional to the angle of the swashplate of the drum pump 142, may be sensed or measured with a sensor 152. The sensor 152 may be, for example, an analog or digital sensor measuring the angle (or, equivalently, the displacement) of the swashplate within the drum pump 142.

The drum pump 142 is further coupled to a first hydraulic motor, here, a hydraulic drum motor 154, which is in turn coupled and arranged to rotate the drum 114 when the machine 100 is traveling. In use, the controller 132 provides directional instructions to the drum pump 142. In an alternate arrangement, the control input 134 may provide may provide directional instructions to the drum pump 142 directly through cable-actuation or the like. Depending on the indicated directions of the drum pump 142, the flow of fluid from the drum pump 142 is routed into one of two conduits, a first conduit 156 and a second conduit 158, which are respectively connected to either side of the hydraulic drum motor 154. In this way, when the engine 110 is running and appropriate controls are applied to operate the drum pump 142, the drum 114 is rotated in order to propel the machine 100 in the desired direction.

A brake 160, shown schematically, is arranged to arrest or stall motion of the drum 114 when actuated by an actuator 162. The brake actuator 162 shown in this embodiment is electronic and actuates the brake 160 causing friction to arrest motion of the drum 114, but other configurations may be used. For example, a pin may be inserted into an opening of a rotating disk connected to the drum 114 such that motion of the disk and drum 114 with respect to the pin is stalled, and so forth. Further, the brake 160 is shown external to the drum 114 for illustration, but more conventional designs such as those having the brake 160 protected within the drum 114 may be utilized.

The hydraulic circuit 130 includes a similar arrangement for rotation of the axle 111, and the attached wheels 112. More specifically, a second pump, here, a variable displacement, bi-directional axle pump 172 is connected to a prime mover, in this case, the engine 110 of the machine 100. In order to simplify the schematic drawing, two separate identifiers are shown for the engine 110 in FIG. 2. In the embodiment illustrated, however, a single engine 110 operates both pumps 142, 172. Hydraulic fluid is discharged from and supplied to the axle pump 172 from the vented reservoir or drain 140.

As with the drum pump 142, the axle pump 172 may be operated in any appropriate manner. In the disclosed arrangement, the control input 134 is connected to a servo control valve (not shown), which is arranged to change the angle of the swashplate (not shown) internal to the axle pump 172 in response to motion of control input 134. Motion of the swashplate is accomplished by an actuator 180 connected to the control input 134. The displacement or angle of the control input 134, which is equivalent or proportional to the angle of the swashplate of the axle pump 172, may be sensed or measured with a sensor 182. The sensor 182 may be, for example, an analog or digital sensor measuring the angle (or, equivalently, the displacement) of the swashplate within the axle pump 182.

The axle pump 172 is further coupled to a second hydraulic motor, here, a hydraulic axle motor 184, which is in turn coupled and arranged to rotate the axle 111 when the machine 100 is traveling. In use, the control input 134 provides directional instructions to the axle pump 172. As with the drum pump 142, in an alternate arrangement, the control input 134 may provide directional instructions to the drum pump 142 directly through cable-actuation or the like. Depending on the indicated directions of the axle pump 172, the flow of fluid from the axle pump 172 is routed into one of two conduits, a first conduit 186 and a second conduit 188, which are respectively connected to either side of the hydraulic axle motor 184. In this way, when the engine 110 is running and appropriate controls are applied to operate the axle pump 172, the axle 111 is rotated in order rotate wheels 112 to propel the machine 100 in the desired direction.

A brake (not shown) may be provided to arrest or stall motion of the axle 111 when actuated by an actuator 192. The brake actuator 192 shown in this embodiment is electronic and actuates the brake causing friction to arrest motion of the axle 111, but other configurations may be used.

In order to provide smooth, coordinated operation of the drum 114 and the axle 111/rear wheel 112, conduits 200, 202 including orifices 204, 206 connect the working sides of the drum and axle pumps 142, 172. When the operator commands motion of the machine by displacing the control input 134, a control signal is relayed to the controller 132 via the command input line 136. This signal causes the drum and axle pump actuators 150, 180 to provide a desired setting for the swashplates of the pumps 142, 172 causes an appropriate flow of motive fluid through the hydraulic motors 154, 184, which results in rotation of the drum 114 and the axle 111, achieving the desired travel speed of the machine. In operation, flow through the conduits 200, 202 between the drum and axle pumps 142, 172 acts to equalize the pressure and flow between the drum circuit and the axle/rear wheel circuit.

Under certain conditions, however, such as when the machine 100 in on a steep incline such that the weight of the machine 100 comes off of the drum 114 disposed uphill, the pressure differential between the drum pump 142 and the axle pump 172 is disturbed and fluid is forced across the orifices 204, 206. In this way, pressure is increased on the uphill drum 114, increasing torque and causing the uphill drum 114 to spin. This spinning can result in unfavorable "uncompaction."

In order to minimize or arrest such uncompaction, the circuit is provided with an arrangement to disconnect or discontinue the flow through the orifices 204, 206. In the illustrated embodiment, a four-port two-way (4-2) valve 210 is provided. During normal operation, flow is provided from the working sides of the axle pump 172 to the working sides of the drum pump 142 through ports 212, 214 to conduits 200, 202. Under conditions where this open flow between the axle pump 172 and the drum pump 142 is detrimental to the operation of the machine 100, however, the controller 132 provides a signal to an actuator 216 to move the valve 210 from the open position illustrated in FIG. 2 to a closed position 218 wherein flow is discontinued through the conduits 200, 202 and the associated orifices 204, 206. The valve actuator 216 is disposed to reciprocally move the 4-2 valve 210 between the two positions, allowing flow or discontinuing flow.

The signal from the controller 132 to the actuator 216 may be initiated by any appropriate source. For example, the pressure differential may be measured by one or more mechanical or electrical sensors 220, 222, or the rotational speed of the axle 111 and drum 114 measured by one or more mechanical or electrical sensors 224, 226. Any number of appropriate sensors may be provided at any number of locations. The number and placement of the sensors 220, 222, 224, 226 shown in FIG. 2 are provided by way of example only and are not meant to be limiting.

Disengagement of the flow between the drum and axle pumps 142, 172 may be initiated as a result of sensor readings or operator input. For example, when the pressure differential between the drum and axle pumps 142, 172 reaches a set amount, the controller 132 may initiate the signal to operate the valve 210. Alternately or additionally, when the difference in the rotational speeds of the axle 111 and the drum 114 reaches a set amount, the controller 132 may initiate the signal to operate the valve 210. Alternately or additionally, the operator may actuate a control input 134, instructing the controller 132 to provide a signal to actuator 216 to actuate the valve 210 to discontinue flow when the operator observes such uncompaction or conditions in which such uncompaction is likely to occur. Other arrangements may likewise be utilized to cause the controller 132 to actuate the actuator 216, such as, for example, sensors that sense the position of the machine 100, identifying when such undesirable flow is likely to occur. Similarly, the valve actuator 216 to move the valve 210 from the closed to the open position may be initiated by the controller 132 as a result of information provided from one or both of one or more mechanical or electrical sensors 220, 222, 224, 226, and from the operator.

Turning now to FIG. 3, a high level block diagram of the operation of an exemplary circuit is shown. Once the engine 110 is started (box 230), the operator commands to the machine 100 to move using the appropriate controls (box 232), such as the control lever 122 in the illustrated embodiment, to advance the machine (box 234). As the machine moves, if a spinning of the drum 114 or the axle 111 is sensed by an appropriate sensor 220, 222, 224, 226 or the operator observes such conditions (box 236), the operator or an automatic system engages to "unbalance" the system (box 238) to disconnect the lines between the axle and drum pumps 172, 142 (box 240). Such sensing by the operator may be provided by visually identifying a spinning of one or the other of the wheels 112 and the drum 114, or by viewing disparities in the pressures at the respective propel pumps 172, 142 of the axle 111 and the drum 114. Alternately or additionally, mechanical or electrical sensors 224, 226 may be disposed to sense differentials in the rotational speeds of the axle 111 and drum 114 or to sense disparities in the pressures with the respective propel pumps 172, 142. The "unbalancing" may occur, for example, as a result of the controller 132 actuating the valve actuator 216 to move the valve 210 to position 218. Alternately, if no spinning is sensed in either the drum 114 or the axle 111 (box 236), the lines and, therefore, the flow between the axle and drum pumps 172, 142 remain connected or engaged (box 242), and the machine continues normal operation per command (box 244) until such time as the machine is stopped (box 246).

INDUSTRIAL APPLICABILITY

The present disclosure is applicable to hydrostatically driven machines having an engine or motor driving a pair of variable displacement pumps, which are fluidly coupled to provide a balancing flow therebetween. The arrangement and/or method of operation may avoid or minimize undesirable uncompaction that may result from variations in the terrain. This minimization may result in enhanced fuel economy and/or operational efficiency.

In some embodiments, the arrangement and/or method may avoid or minimize overdriving one or the other of the propel pumps during normal operation. Minimizing such overdriving may result in enhanced part life, as well as minimization costs associated with maintenance or repair.

In some embodiments, various sensors may be provided that sense conditions under which disengagement of the fluid connection between the propel pumps is desirable. Alternately or additionally, the arrangement and/or method may provide for direction by the operator to disengage the fluid connection. Thus, the arrangement and/or method provide for various options in configuration of the system.

The advantages of this configuration can be readily appreciated as fuel economy and noise are reduced during operation, and the efficiency of the system is increased.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

I claim:

1. A method of controlling the propulsion of a machine having a main frame, at least first and second rotatable motivators coupled to the frame in spaced relation, an engine supported on said main frame, a first hydraulic motor operatively connected with said first motivator, and a second hydraulic motor operatively connected with said second motivator, the method comprising the steps of
fluidly coupling a first pump to said first hydraulic motor, operatively connecting the first pump to the engine,
fluidly coupling a second pump to said second hydraulic motor,
operatively connecting the second pump to the engine,
disposing at least one fluid control orifice in fluid communication between said first and second pumps, said fluid control orifice being adapted to allow fluid flow between the first and second pumps,
selectively disengaging the orifice to discontinue flow between the first and second pumps in response to a signal during operation of the machine.

2. The method of claim 1 wherein the signal results from at least one of the following:
operator instruction,
a sensed pressure differential between the first and second pumps, the pressure differential being in excess of a first preset level, and
a sensed disparity in rotational speed between the first and second motivators, the disparity being in excess of a second preset level.

3. The method of claim 2 further including the steps of providing at least one sensor disposed to sense the respective pressures of the first and second pumps, and sensing pressure differentials between the first and second pumps.

4. The method of claim 2 further including the steps of providing at least one sensor disposed to sense the rotational speed of at least one of the first motivator and the second motivator, and sensing disparities in rotational speed between the first and second motivators.

5. The method of claim 1 further including the steps of disposing a valve having at least two positions between the first and second pumps, disposing the valve in a first position providing flow through the fluid control orifice, and disposing the valve in a second position to disengage the orifice and discontinue flow.

6. The method of claim 5 wherein a controller provides a signal to reciprocate the valve between the first and second positions.

7. A fluid control system in a machine having a main frame, at least a first rotatable motivator and a second rotatable motivator in spaced relation supporting said main frame, an engine supported on said main frame, the fluid control system comprising
a first pump connected to the said engine,
a first hydraulic motor operatively connected with said first motivator, said first pump being fluidly coupled to said first hydraulic motor,
a second pump connected to said engine,
a second hydraulic motor operatively connected with said at least one second motivator, said second pump being fluidly coupled to said second hydraulic motor, and
a fluid control orifice disposed to provide selective fluid communication between said first and second pumps, said fluid control orifice being selectively disengageable in response to a signal during operation of the machine.

8. The system of claim 7 wherein the signal is based upon at least one of the following: an operator instruction, a sensed pressure differential between the first and second pumps, the pressure differential being in excess of a first preset level, or a sensed disparity in rotational speed between the first and second motivators, the disparity being in excess of a second preset level.

9. The system of claim 8 further including at least one a pressure sensor adapted to sense the respective pressures of the first and second pumps.

10. The system of claim 8 further including at least one speed sensor disposed to sense the rotational speed of at least one of the first and second motivators.

11. The system of claim 8 further including at least one controller adapted to receive at least one of a sensed pressure or a sensed speed of at least one of the first or second motivator, or a signal from an operator, and to cause the fluid control orifice to disengage in response to at least one of the operator instruction or the sensed pressure differential in excess of the first preset level, or the sensed disparity in rotational speed in excess of the second preset level.

12. The system of claim 7 further including a valve having at least two positions, the valve being fluidly disposed to allow flow through the orifice between the first and second pumps in a first position, and the valve being disposed to not allow flow through the orifice in a second position.

13. The system of claim 12 further including at least one controller disposed to provide the signal to reciprocate the valve between the first and second positions, the controller being adapted to receive at least one of a sensed pressure or a sensed speed of at least one of the second motivator or the first motivator, or an operator signal from an operator.

14. The system of claim 13 further including at least one of an electrical or mechanical sensor disposed to sense the respective pressures of the first and second pump or the rotational speed of at least one of the first and second motivators, and wherein the valve is a two-position, four-port valve.

15. A machine comprising
a main frame,
a first motivator rotatably coupled to the main frame,
a second motivator rotatably coupled to the main frame,
an engine supported on said main frame,
a first pump connected to the said engine,
a first hydraulic motor operatively connected with said first motivator, said first pump being fluidly coupled to said first hydraulic motor,
an second pump connected to said engine,
an second hydraulic motor operatively connected with said at least one second motivator, said second pump being fluidly coupled to said second hydraulic motor, and
a fluid control orifice disposed to provide selective fluid communication between said first and second pumps, said fluid control orifice being selectively disengageable in response to a signal.

16. The machine of claim 15 wherein the signal is adapted to be provided in response to at least one of an operator instruction, a sensed pressure differential between the first and second pumps, the pressure differential being in excess of a first preset level, and a sensed disparity in rotational speed between the first and second motivators, the disparity being in excess of a second preset level.

17. The machine of claim 15 further including at least one pressure sensor disposed to sense the respective pressures of the first and second pumps, or speed sensor disposed to sense the rotational speed of at least one of the first and second motivators.

18. The machine of claim 15 further including at least one controller adapted to receive at least one of a sensed pressure or a sensed speed of at least one of the second motivator or the first motivator to a controller, or a signal from an operator, and to cause the fluid control orifice to disengage in response to at least one of the operator instruction or the sensed pressure differential in excess of the first preset level, or the sensed disparity in rotational speed in excess of the second preset level.

19. The machine of claim 15 further including a valve having at least two positions, the valve being fluidly disposed to allow flow through the orifice between the first and second pumps in a first position, and the valve being disposed to not allow flow through the orifice in a second position.

20. The machine of claim 19 wherein the first motivator includes a yoke coupled to the frame and at least one compacting drum rotatably mounted on said yoke, and the second motivator includes at least one axle mounted on said main frame and at least one wheel coupled to said axle and rotatably mounted relative to the main frame, the machine further including at least one controller adapted to receive at least one of a sensed pressure or a sensed speed of at least one of the drum or the wheel, or a signal from an operator, and said controller being adapted to provide a signal to reciprocate the valve between the first and second positions.

* * * * *